July 19, 1955   H. E. SIVERSON   2,713,276
SAW CHAIN TOOTH
Filed Jan. 18, 1954   2 Sheets-Sheet 1
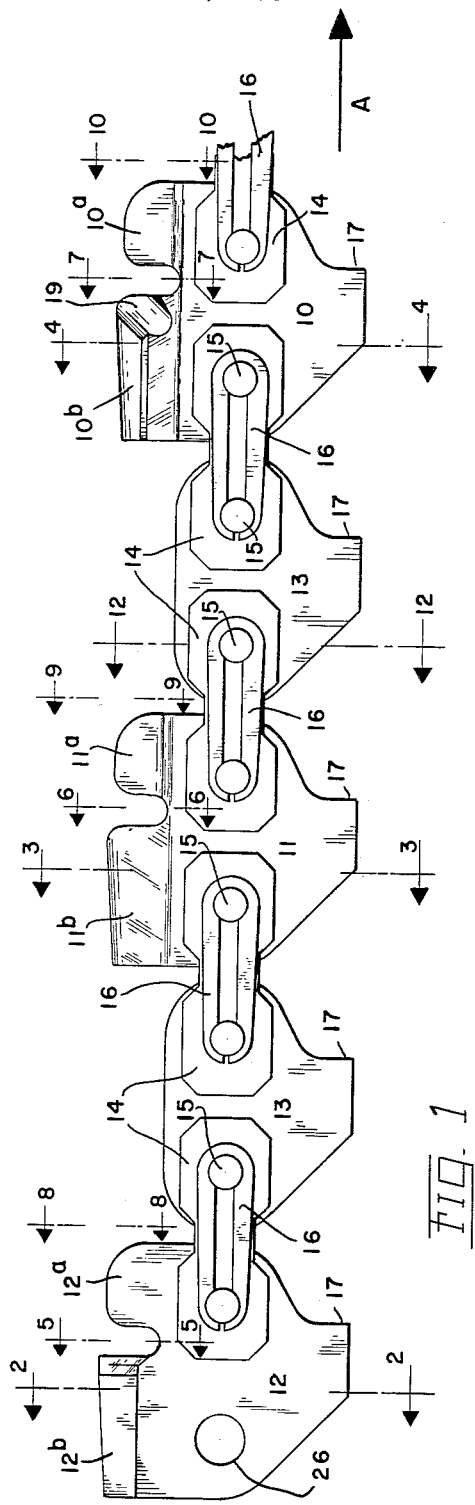
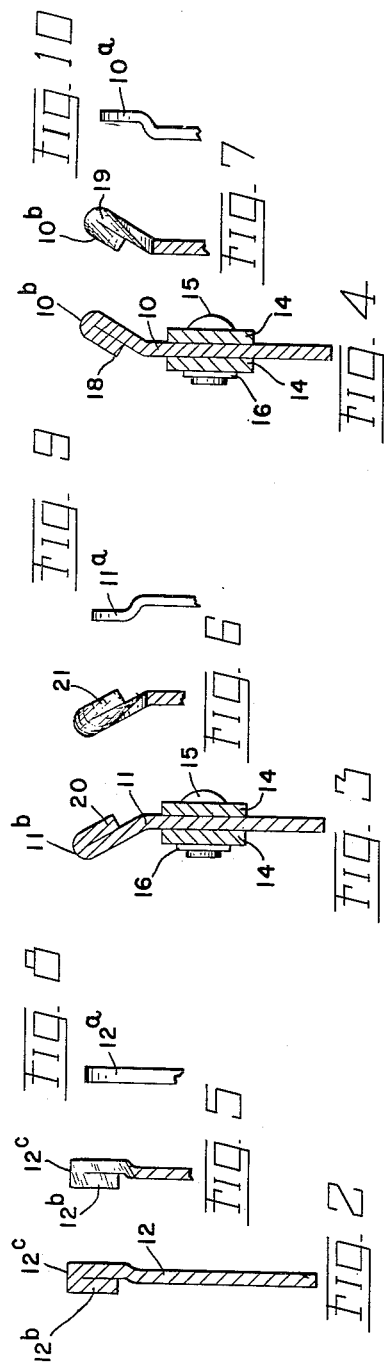
INVENTOR.
HARRY E. SIVERSON
BY
*T. R. Geisler*
ATTORNEY July 19, 1955  H. E. SIVERSON  2,713,276
SAW CHAIN TOOTH
Filed Jan. 18, 1954  2 Sheets-Sheet 2
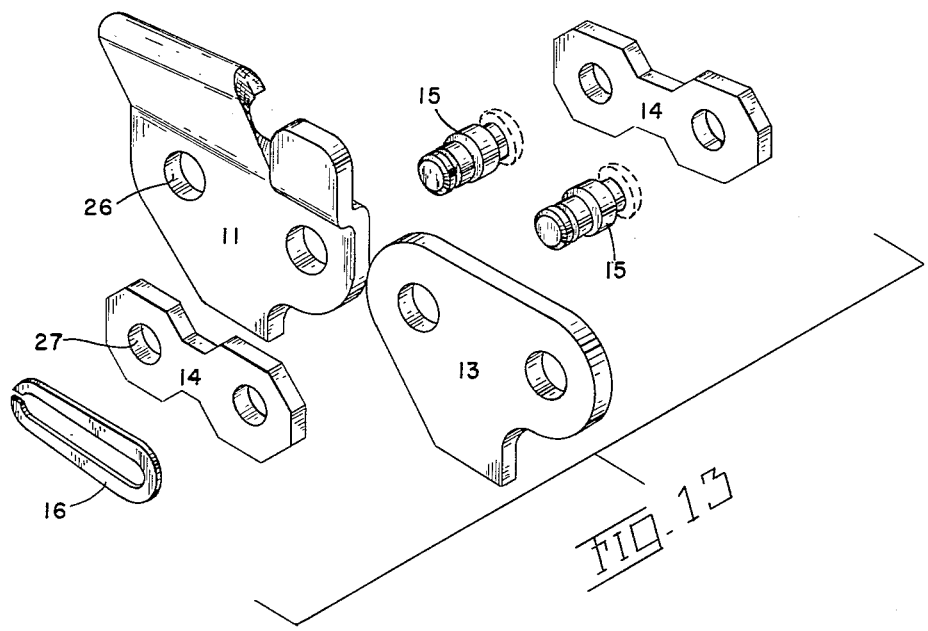
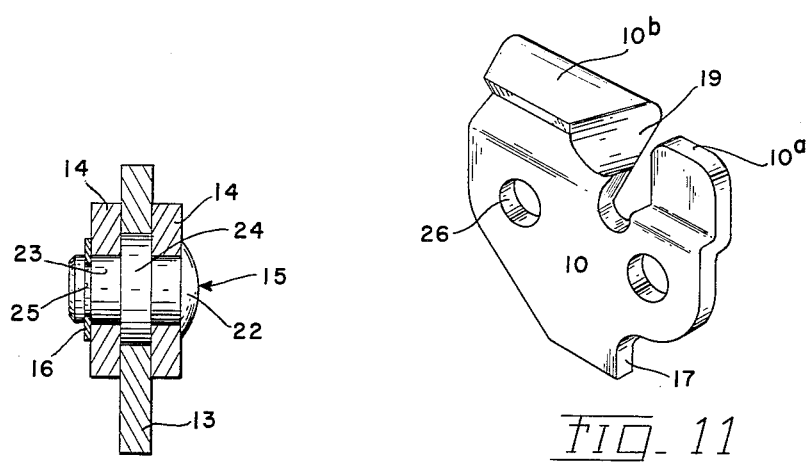
INVENTOR.
HARRY E. SIVERSON
BY
ATTORNEY

United States Patent Office 2,713,276
Patented July 19, 1955

2,713,276

SAW CHAIN TOOTH

Harry E. Siverson, Portland, Oreg.

Application January 18, 1954, Serial No. 404,477

3 Claims. (Cl. 76—112)

This invention relates to improvements in saw chain and saw chain construction.

As is well known, a saw chain requires the cutting of a wider kerf in the wood than a single blade saw in order to provide clearance in the cut or kerf for the linkage and means by which the separate individual saw tooth members are connected up in the saw chain. For this reason it is necessary in the average saw chain to provide successive series or groups of teeth, each tooth of the group being slightly different from the others in the group and performing its individual cutting action slightly out of alignment with the cutting action of the others, so that the kerf, which is wider than the thickness of any single tooth, may be cut to the proper width as a result of the total work performed by the teeth in the group. Thus, where each group of teeth is composed of only three teeth, as is the case in the present invention, the teeth may be described as a left tooth, a right tooth, and a center tooth or raker. The left tooth and the right tooth cut the left and right side walls of the groove and cut the grain of the wood, and the center tooth clears out or rakes out the central portion of the groove.

One of the objects of the present invention is to provide an improved saw chain in which each of such groups or series of teeth will comprise a fewer number of separate or different teeth, and thus, as a result, have the entire saw comprising fewer differing shapes or species of teeth with a relatively larger number of teeth of each shape. It will be readily understood that having relatively greater numbers of similar teeth considerably facilitates the filing or sharpening of the teeth.

A related object of the invention is to provide individual saw teeth the cutting portion of which will be of considerably increased width or thickness so as to enable each individual tooth to cut over a wider area, but without increasing the thickness of the remaining or body portion of the tooth and thus without increasing the overall thickness of the saw chain.

Another object of the present invention is to provide improved saw teeth in a saw chain, the cutting faces and edges of which teeth will not only be wider but will also be heavier and stronger and thus capable of longer life.

While in some cases heretofore the teeth in saw chains have been made heavier or thicker at their cutting edges by welding additional strips of metal at such portions, this method of reinforcing the cutting portion has not been found entirely satisfactory and furthermore adds considerable to the cost of producing the tooth.

An important object of the present invention is to provide an improved method of making or forming individual saw chain teeth which will produce this extra thickness on the working portion of the tooth without requiring any separate strip of metal to be added and secured to the tooth, or without requiring any thinning down of the tooth body or the portion of the tooth which rides in the groove.

Sometimes an individual tooth in a saw chain becomes broken or damaged to such an extent that the replacement of such a tooth is necessary. The removal and replacing of a tooth in the average saw chain involves considerable inconvenience and loss of time. A further object of the present invention is to provide an improved saw chain construction in which any tooth may be removed and replaced quickly and easily.

The manner in which these objects and other incidental advantages are attained in my improved saw chain will be readily understood from the following brief description with reference to the accompanying drawings.

In the drawings:

Figure 1 is a side elevation of a portion of my improved saw chain showing the saw teeth which comprise one of the identical groups or series of teeth of which the entire saw chain is made up;

Figure 2 is a sectional elevation through one of the three saw teeth comprising the group in Figure 1, the section being taken on line 2—2 of Figure 1;

Figure 3 is a corresponding sectional elevation through the second saw tooth of the group in Figure 1, this section being taken on line 3—3 of Figure 1;

Figure 4 is a corresponding sectional elevation through the saw tooth furthest on the right in Figure 1, this section being taken on line 4—4 of Figure 1;

Figures 5, 6 and 7 are fragmentary elevations, partly in section, taken on lines 5—5, 6—6 and 7—7, respectively, of Figure 1, and showing the forward ends or faces of the three saw teeth respectively;

Figures 8, 9 and 10 are fragmentary elevations on lines 8—8, 9—9 and 10—10 of Figure 1, respectively, showing front views of the "riders" serving as the cutting guide portions of the teeth, respectively;

Figure 11 is a perspective view of the first tooth of the group in Figure 1, that is to say, the tooth furthest to the right as viewed in Figure 1, showing the tooth by itself and entirely removed from the saw chain;

Figure 12 is a section on line 12—12 of Figure 1, but drawn to a considerably larger scale, showing one of the link joint connections of the saw chain; and Figure 13 is an exploded view showing in perspective the elements which combine to form one of the hinged link joints by which members of the saw chain assembly are connected.

Referring first to Figure 1, in which the arrow A indicates the relative direction traveled by a saw chain when in operation, 10, 11 and 12 indicate the three teeth or cutting tooth links of the group. Each of these three teeth or cutting tooth links is slightly different. Between each two successive cutting tooth links a center link member 13 is interposed. The cutting tooth links and the center link members are connected by pairs of identical side links 14, the side links of each pair being positioned on opposite faces of the chain saw as is customary. The pairs of side links 14 are attached to the cutting tooth links and to the center link members by hinge pins 15, and a snap-on keeper 16 holds the two hinge pins 15 for each pair of side links against slipping out of the saw chain. The hinge pins 15 and snap-on keepers 16 will be described more fully later.

The cutting tooth links 10, 11 and 12 and the interposed center links 13 are formed with identical sprocket tooth portions 17 on the inner or non-working edge of the saw for proper engagement with the driving sprocket (not shown) through the medium of which the driving of the saw takes place in the customary manner.

The cutting tooth links 10, 11 and 12, and the center link members 13 are made from suitable sheet metal of uniform thickness, each tooth link and each center link member being formed with a pair of holes 26 for the hinge pins 15. Each center link member 13 extends in a single plane only while the working portions of the tooth links are deformed somewhat with respect to the plane of the remaining portion of the tooth link body.

The tooth link 10 (Figures 1, 4, 7, 10 and 11) has an off-set "rider" portion 10A spaced from and in front of the cutting or working portion 10B. In the stamping out of the tooth link blank the longitudinal edge of the part which is to form the cutting portion 10B is made to extend beyond the desired finished cutting edge. This extended edge is then folded over on itself. With some grades of metal it may be desirable to heat the blank first before folding the edge over to prevent any possibility of the metal cracking at the crease or fold line, but in most instances I have found such heating to be unnecessary. The folding over of the edge part forms the working portion of the tooth and this working portion is subjected to necessary pressure to deform, shape and position the same as illustrated in Figures 4, 7, 10 and 11. As a result of the pressure applied to the folded-over edge 18 (Figure 4), this folded-over edge is practically united with the part which it overlies, so that in effect this portion of the tooth link becomes solid metal of double thickness.

After the edge 18 has been folded over on itself and the formation of the tooth has been completed as mentioned, the forward face 19 (Figures 1, 7 and 11) is ground or filed to produce the inwardly-extending chisel-like face having an outer cutting edge as illustrated. The double thickness of the working portion of the tooth thus enables the tooth to make substantially twice as large a cut as the same tooth would make if the working portion were limited to the usual single thickness of metal. Preferably the external folded-over edge is allowed to remain rounded, as shown in Figures 4 and 7. Also, preferably the grinding or sharpening of the forward face of the double-thickness working portion is done with a rounded file which results in a rounded, chisel-like cutting edge on the outer face of the tooth.

It will be noted that the folded-over edge 18 (Figures 1, 4 and 7) is on the inside face of the tooth, and, with the grinding of the chisel face 19, the end of the folded-over portion is cut back. As a result only a minimum amount is ground from the outer portion of the tooth. The advantages in this will be obvious. The "rider" portion 10A of the tooth link (Figure 10) is off-set (to the right as viewed in Figure 10) slightly less than the amount to which the working portion 10B of the tooth link extends in the same direction (to the right as viewed in Figure 7), and it will be noted that the top or longitudinal "rider" 10A also does not extend out as far from the main body of the tooth link as the working portion 10B. The reason for this will be apparent since the "rider," in the manner well known in the art, acts as a gauge to restrict the amount or depth of the cut which will be made by the cutting or working portion of the tooth link.

The second tooth link 11 of the group is formed in exactly the same manner as the tooth link 10 (see Figures 1, 3, 6 and 9), except that its working portion 11B extends on the opposite face of the working edge of the saw. The folding over of the edge portion 20 of this tooth link, the grinding of the front face 21, and the off-setting of the "rider" 11A are reversed from that of tooth link 10. The tooth link 11 thus cuts the side wall and grain on one side of the kerf in the wood while tooth link 10 cuts side wall and grain on the other side.

Thus, the working portion of the tooth link 10 extends off to one side from the plane of the center line of the saw chain and the working portion of the tooth link 11 extends off to the opposite side of the plane of the center line. It will be apparent therefore that, downward pressure or cutting on the saw during the cutting will have a tendency to cause the working portions of these teeth to lean out further to the respective sides or walls of the cut towards which they are inclined and thus slightly increase the width of the cut which in turn results in greater clearance for the saw chain. In the returning or upper portion of the saw chain, the tooth links 10 and 11 will, of course, resume their normal positions with respect to the plane of the center line of the saw chain, and thus have greater clearance when returning through the upper portion of a deep kerf or cut. It is desirable that a slight play be provided for in the mounting connections for the cutting teeth to allow for this slight outward leaning of the cutting teeth to take place when the saw chain is pressed into the wood during the cutting operation.

The middle portion of the kerf is cut by the third tooth link or raker tooth 12 of the group. The working portion 12B of the tooth link 12 (Figure 2) is parallel to the plane of the main body portion, and the "rider" 12A does not have any off-set portion. Preferably, but not necessarily, the outer edge 12C (Figures 2 and 5) of this raker tooth is flattened or ground flat, instead of being round like the corresponding edges of the teeth 10 and 11. This aids in keeping the raker tooth working portion centrally positioned in the kerf during the cutting. The forward face of the cutting portion of the raker tooth is ground at an angle which cuts and crumbles out the part of the kerf between the side cuts made by the two teeth 10 and 11 and lays the resulting chips and sawdust on one side. The shape of the teeth 10 and 11 and the shape of the raker tooth 12 result in freer and easier cutting, which, in turn, makes my improved saw chain very suitable for low horsepower saws.

Due to the increased thickness of the working portions of the tooth links the three tooth links 10, 11 and 12 are sufficient for cutting the kerf to the full width necessary for receiving the saw chain. Consequently, for a saw chain of ordinary thickness three different teeth for each series or group are all that will be required with my improved saw chain construction, whereas five, six or even more different teeth are required for each group of teeth in most other saw chains of the same thickness having the customary scratcher-type teeth. Since there are only three different tooth links in each series or group there are only three different shapes of teeth to be sharpened when sharpening of the saw chain becomes necessary. This considerably facilitates the sharpening operation. The double thickness along the working edge of each tooth link, in addition to reducing the number of different shapes of teeth required, provides added strength and material where there is most wear and where tooth breakage is most likely to occur.

The pair of side links 14 are attached to the center link members 13 and to the connected cutting tooth links by transversely-extending hinge pins 15, one of which is shown most clearly in Figure 12. Each hinge pin 15 has an enlarged head 22 at one end. The shank 23 of the hinge pin has a central portion 24 of enlarged diameter, and an annular groove 25 is formed adjacent the other end of the pin. The central or large diameter portion 24 corresponds in diameter to the diameter of the enlarged holes 26 for the hinge pins which are provided in the cutting tooth links and center link members. The axial length of this large diameter portion 24 equals the thickness of these tooth links and center link members. The remaining portions of the hinge pin shank on both sides of the large diameter portion 24 are of the same diameter as the holes 27 in the pairs of side links 14 and the axial length of these portions is equal to the thickness of the side links 14.

The annular groove 25 near one end of each hinge pin is of the proper width to receive the snap-on keeper 16. Since the snap-on keepers 16 are slit at one end, a snap-on keeper can easily and quickly be taken off the two pins on which it is carried by inserting a suitable tool, such as a small screw driver, in the center slot of the keeper and then turning the screw driver enough to force the jaws at the slitted end of the keeper sufficiently apart to enable the keeper to be lifted or slid from the grooved ends of the two hinge pins. With the snap-on keeper removed the adjacent side link is then easily slid off the hinge pins and consequently the removal of a cutting tooth link from my saw chain requires only the removal of two snap-on keepers and the two side links beneath the keepers. Since the snap-on keepers, while in place, are subjected to no strain and to only a negligible amount of wear they can be made of comparatively thin metal, and as a result do not cause any appreciable increase in the overall width of the saw chain.

Thus, in my improved saw chain construction, each tooth link can be quickly and easily removed and replaced, only a minimum number of different forms of cutting teeth are used, the sharpening of the teeth is facilitated, and the working portions of the tooth links are made heavier and stronger without necessitating any increase in the thickness of the main body of the tooth links or any increase in the overall width of the saw chain.

I claim:

1. The improved method of making a saw chain tooth link, which method includes forming a blank in the general overall size and pattern desired for the tooth link but with the longitudinal edge of the cutting portion extended beyond the desired size, folding said extended portion over on itself, subjecting the folded-over and underlying portions to unifying pressure and deforming them into proper working position relative to the body of the tooth link, and finally grinding the forward end of the folded-over and underlying portions to form a cutting face extending obliquely rearwardly with respect to the direction of travel of the tooth when in operation.

2. The improved method of making a saw chain tooth link, which method includes forming a blank in the general overall size and pattern desired for the tooth link but with the longitudinal edge of the cutting portion extended beyond the desired size, folding said extended portion over on itself so that the fold-over portion will be on the inside face of the working portion of the tooth when finished, subjecting the folded-over and underlying portions to unifying pressure and deforming them into proper working position relative to the body of the tooth link, and finally grinding the forward end of the folded-over and underlying portions to form a cutting face extending obliquely rearwardly on said inside face of said working portion with respect to the direction of travel of the tooth when in operation.

3. A cutting tooth link for a saw chain of the character described, said link made from a blank of substantially uniform thickness having a main body portion, a cutting edge portion, and a rider portion, said cutting edge portion having been extended beyond the desired size and folded over on itself to produce double thickness along the cutting edge, said double edge cutting portion unified and inclined from the plane of said main body portion, and said rider portion offset slightly from said main body portion on the same side as said cutting edge portion is inclined.

References Cited in the file of this patent

UNITED STATES PATENTS

| | | |
|---|---|---|
| 1,947,421 | Mize | Feb. 13, 1934 |
| 2,102,305 | Chormann et al. | Dec. 14, 1937 |
| 2,118,736 | Odom | May 24, 1938 |
| 2,351,112 | Day | June 13, 1944 |
| 2,622,636 | Cox | Dec. 23, 1952 |
| 2,651,336 | Warren | Sept. 8, 1953 |
| 2,662,427 | Smal | Dec. 15, 1953 |